No. 766,212. PATENTED AUG. 2, 1904.
A. P. ANDERSON.
CEREAL PRODUCT.
APPLICATION FILED JULY 11, 1902.
SPECIMENS.
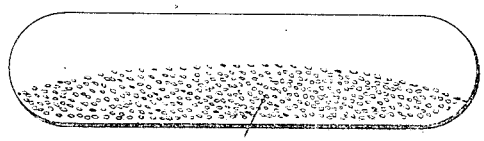
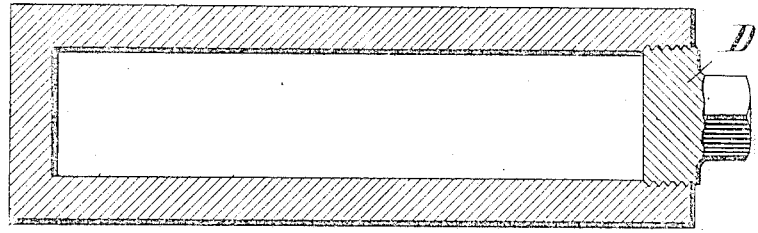
WITNESSES:
INVENTOR
Alexander P. Anderson,
BY
His Attorney.

No. 766,212. Patented August 2, 1904.

UNITED STATES PATENT OFFICE.

ALEXANDER PIERCE ANDERSON, OF BEDFORD PARK, NEW YORK.

CEREAL PRODUCT.

SPECIFICATION forming part of Letters Patent No. 766,212, dated August 2, 1904.

Application filed July 11, 1902. Serial No. 115,221. (Specimens.)

*To all whom it may concern:*

Be it known that I, ALEXANDER PIERCE ANDERSON, a citizen of the United States of America, residing at 629 One Hundred and Ninety-eighth street, Bedford Park, Bronx borough, in the city of New York, in the county and State of New York, have invented certain new and useful Improvements in Cereal Products; and I do hereby declare the following to be a full, clear, and exact description of the invention, such as will enable others skilled in the art to which it appertains to make and use the same.

My invention relates to cereal-products or products prepared from wheat, rye, oats, barley, rice, maize, and in general all grains and amylaceous seeds or kernels; and its object is to provide products of this character which, while not losing their original shape or identity, shall be ready for consumption as a palatable, readily digestible, and nutritious article of food either alone or when mixed with water, soup, or the like.

With these objects in view my invention consists in a cereal in the form of grains or comminuted which is spongy in structure and the hull of which has been removed, (in the case of unhulled cereals.) This article is, moreover, distinguished by that the structure of the starch-granules thereof has been obliterated substantially throughout the mass. In the case of grains retaining their inner grain-coating the surface of the finished product is dotted with the remains of such coating.

My invention, moreover, consists in such further features as will be hereinafter set forth, and pointed out in the claims.

In my Patent No. 707,892, dated August 26, 1902, and issued on an application pending concurrently herewith, I have described the method of preparing my new cereal product, and I will now describe the said method for the purpose of a complete disclosure.

In preparing my new cereal product I preferably heat a cereal or cereals of any description, including all kinds of amylaceous seeds or kernels, in a substantially air-dry condition under gas-pressure—such, for example, as air-pressure—to a point above the boiling-point of the liquid contained in the starch-granules of the cereal at normal atmospheric pressure, or, what is practically the same thing, above the boiling-point of water at normal atmospheric pressure, for a period of time not long enough to permit the escape of too much of the liquid contained in the starch-granules of the cereal or cereals through the granule-coatings by diffusion. I thereupon, while substantially maintaining the said temperature, release or remove the pressure from the cereal or cereals with such rapidity that the liquid will suddenly burst or flash into gaseous form or steam, which will result in an instantaneous expansion or explosion of the entire mass of the cereals into several times its original volume. This expansion is such that the grains or kernels of the cereals preserve their exact original shape and become very much enlarged and porous copies of the original grains or kernels, provided the heat applied be sufficient to render the granule material sufficiently coherent after the explosion. What I consider the best temperature for this purpose is given below, and it is probable that such temperature softens the starch-cellulose sufficiently to become adhesive or sticky.

It should be observed that it is within the scope of my invention not only to quickly remove the entire pressure upon the cereal while heated to a certain temperature under such pressure, but also to merely reduce the said pressure to a point sufficiently below the point at which the liquid contained in the granules will boil at such temperature to cause the same to suddenly burst into a gaseous condition. The important point under all conditions is to heat the starch material under pressure and thereafter while the same is thus heated to suddenly reduce said pressure sufficiently below the point at which the liquid boils at the temperature imparted to cause the same to suddenly gasify.

A more detailed description of the method of preparing my new cereal product is as follows: The cereal, which may be any one or several of the products or substances enumerated above, is placed in a vessel, which is then hermetically closed. The vessel is now subjected to heating intensely enough to raise the temperature of the vessel to the desired point—say from 125° to 300° centigrade—within a short period of time—say not exceeding forty-five minutes. This heating of the vessel of course causes an increase in the pressure of the confined air in the vessel. At the completion of this step of the process the vessel is suddenly opened, thus quickly reducing the pressure of the confined air to normal. The result will be a practically instantaneous swelling of the grains, so that the cereal being treated has a greatly-increased volume. In view of this sudden swelling it is important either to employ a vessel whose capacity is sufficient to contain the cereal when swollen or to provide means for the quick discharge of the same from the vessel when the latter is opened in order to allow sufficient space for the swelling of the grains at the moment of the reduction of the pressure.

In the accompanying drawings I have illustrated two kinds of apparatus which may be employed in carrying out this process.

In the drawings, Figure 1 represents in side elevation a glass tube; and Fig. 2, a longitudinal section of a metal tube for this purpose.

In carrying out my process in a small way I have heretofore constructed the vessels in the form of glass tubes A, which were sealed by fusion after the necessary amount of substantially air-dry material B was placed within such tubes in a manner well known to chemists. After quickly heating the tubes to the desired temperature they are broken in any suitable way or will sometimes burst, owing to the pressure of the confined air. In either case the pressure of the air is suddenly reduced, and the starch-granules are at once swollen. For example, I fill the glass tubes about three-fourths with air-dried unhulled rice or buckwheat and put them into an oven for about twenty minutes, the temperature of the oven being during this time raised from 100° to 170° centigrade. I then take out the tubes and break them before cooling, when the starchy endosperm will suddenly expand to a greatly-enlarged porous copy of itself, the hulls being thrown off. These hulls may be readily fanned away from the swelled starch mass.

For the practice of my invention on a large scale suitable metallic vessels in the form of air-tight cylinders C with removable heads D, which are fitted thereto air-tight by suitable packings or otherwise, may be employed. These are partly filled with the material to be treated and closed, then thrust into an oven of a temperature great enough to raise the contents of the cylinder to the required temperature with sufficient rapidity. For example, the temperature of the oven may vary between 125° and 200° centigrade, and the time during which the vessel is submitted to the heating of such an oven may vary from approximately ten minutes to forty-five minutes, being inversely proportional to the temperature. Thereupon the cylinder is quickly removed from the oven and the cylinder-head immediately taken off. If desired, other means for applying the fluid-pressure to the granule liquid of the starch may be employed to raise the boiling-point of said liquid—for example, by compressing air into the vessel containing the material to be treated during the application of the heat to such vessel, in which case the hermetical sealing of the vessel is not important, provided the leakage of air is not greater than the air-compressing mechanism can meet and still maintain the desired pressure, or I may employ for this purpose an apparatus such as described in United States Letters Patent to Lyman, No. 21,077, dated August 3, 1858, or an apparatus such as shown in Fig. 3 and described in the specification of my aforesaid Patent No. 707,892.

The new products which may be prepared according to the process above described are essentially distinguished by the fact that they are cereals which, whether in the shape of the whole grain—such as wheat, rye, oats, barley, corn, rice, millet, buckwheat, or the like—or broken up, as in the case of hominy-grits, wheat-grits, pearl-wheat, or the like, exist in a hulled, swelled, and spongy condition, the structure of the starch-granules of which has been obliterated, broken up, or disrupted substantially throughout the mass, the hulling being done concurrently with the swelling. They are thus radically distinguished from ordinary popcorn as made according to the old methods, wherein the entire hull or glume is retained and enveloped by the expanded endosperm. As is well recognized, this is a very objectionable feature in this article. Popcorn expanded according to my method is rendered unobjectionable in this particular, inasmuch as the hull is thrown off and easily removed by fanning or the like. As a matter of fact, all unhulled cereals made according to my invention are hulled coincidently with the expansion, the hull or husk not expanding and being therefore thrown off by the sudden expansion of the endosperm. It is only owing to the peculiar nature of the hull of popcorn that it has been possible to swell the same by the dry method hitherto known. No other cereal has heretofore been susceptible to such treatment, and I have been the first to pop cereals of all kinds and also to pop or explode popcorn in a more perfect manner than hitherto attainable.

Another result of my method where unhulled cereal-grains or grains retaining the inner bran coating or aleurone (or layer of aleurone cells) are employed is that this aleurone layer, which contains the greater proportion of the protein substances of the grain, is retained and covers or dots the ready product in the form of small irregular spots or patches. An essential nutritive part of the grain is thus retained, while the indigestible husks or glumes, consisting mainly of cellulose, are thrown off and may be easily fanned or blown away. This result is obtained when cereals like paddy-rice, buckwheat, millet, maize, and the like are employed.

Another important characteristic of my new article of manufacture is that the same retains, in substance, the original shape, though on a greatly-enlarged scale, of the original cereal. This is important, since it enables the article to be readily identified, thus making adulteration difficult, and makes the same otherwise desirable to consumers. The new products are, moreover, readily identified by microscopic examination—*i. e.*, there are no intact starch-granules present, (when the expansion has been complete,) and the whole kernel and seed (grain) becomes a spongy cellular pith-like mass. The original cell structure of the grain and the structure of the starch-granules contained in the cells have been disrupted and obliterated and a new honeycomb-like structure similar to pith, such as elder-pith, has taken their place, each cell of which is much larger than the original cells and is empty, excepting that they are filled with air. The walls of these honeycomb-like cells or cavities are made up of the particles formed from the ruptured and obliterated starch-granules, together with the gluten, fiber, and other materials present in the seed before the expansion of the same.

The cavities or new cells in the resultant cereal product are honeycomb-like in that they are sealed, there being no openings between the cells. They are, however, not generally of a uniform size or elongated, as in a honeycomb. They resemble the cells of elder-pith when the cell contents of the same have disappeared to such an extent that other tests besides those of the microscope will have to be resorted to to distinguish between the two. A very effective test for this purpose is the action of water, which breaks down and dissolves or emulsifies the cell membranes of my new cereal product, while leaving intact the cell membrane of elder-pith.

My new product is thus essentially and fundamentally distinguished from boiled rice and other boiled grains, as well as what is known in the market as "granose flakes," in that the latter have no cell cavities and present a solid homogeneous mass.

The fact that my new cereal product is mainly made up of empty cavities or pith-like cells I have designated in the claims by the term "spongy."

There are many uses to which the new articles of manufacture may be applied. They may be eaten without further treatment, being readily permeated, emulsified, and dissolved by the saliva and gastric juices. They may also be added to soup or dissolved in water to form gruel and the like, or they may be further cooked in a variety of ways. Unhulled rice, for example, when hulled and expanded according to my invention makes an attractive entrée or relish and may be served like salted almonds, or it may accompany broths and soups, just as small crackers or biscuits at present.

The enlarged or expanded cereal-grains are easily flattened between rollers—*e. g.*, by running them through a wringer or the like—without losing their distinguishing characteristics and without changing them structurally, the cells or cavities being merely flattened. In this flattening there is no fusion of cavity-walls, &c., so that a microscopic examination would disclose the same structure as in cereal-grains according to my invention, which have not been flattened or compressed. The expanded cereals could when crisp also be ground into a flour, which could be used for the purpose of making infants' foods, or they are ready as infants' foods by simply adding water or milk.

While it is true that in the new product the starch-granules are substantially all obliterated or broken up throughout the grain-cereal, the starch of the same remains, although it is probable that a portion of the starch is converted into dextrin-like substance or products intermediate between starch and dextrin. The other component substances are all changed in such a manner that they readily go into solution and emulsion with water, and all are readily assimilated by the saliva and gastric juices.

By the term "cereals" as employed in the mere generic claims I desire to be understood as covering both the whole cereal-grain, as also the grain in a broken-up or comminuted form, as in the case of pearl grits, wheat-grits, hominy, &c., and also pearled cereals, such as "pearl wheat."

While I have herein described a process for producing the new cereal product herein described and claimed, for the purpose of a more complete disclosure, the same is not claimed herein, being separately described and claimed in my Patent No. 707,892, hereinbefore referred to.

While I have herein described the flattened cereal in which the starch-granules have been disrupted, as described, and which presents the pith-like cellular structure as set forth, this having been done in further illustration of the scope of my invention, such flattened product is not herein specifically claimed, since it constitutes the subject-matter of my application, Serial No. 133,283, filed November 29, 1902, (No. 5.)

What I claim, and desire to secure by Letters Patent of the United States, is—

1. As a new article of manufacture, a dry swelled spongy cereal-grain, the structure of whose starch-granules has been disrupted substantially throughout the same, the remains of said starch-granules being contained in the cell-walls of the new article, the new article preserving substantially the shape of the original grain.

2. As a new article of manufacture, a hulled, swelled and spongy cereal-grain, having its starch-granules disrupted, the remains of the starch-granules being contained in the cell-walls of the new article.

3. As a new article of manufacture, a dry hulled spongy cereal-grain having a pith-like cell structure swelled or expanded in size and preserving substantially its original shape.

4. As a new article of manufacture, a dry hulled spongy cereal-grain having a pith-like cell structure, the cell-walls of which contain the remains of the disrupted starch-granules thereof, the said grain being swelled or expanded in size and preserving substantially its original shape.

5. As a new article of manufacture, a hulled, swelled and spongy cereal-grain, having its starch-granules disrupted, the remains of the starch-granules being contained in the cell-walls of the new article, the said cell-walls capable of being readily dissolved or broken down by water.

6. As a new article of manufacture, a hulled spongy cereal-grain, the structure of the starch-granules of which is disrupted substantially throughout the body of the same and whose surface is dotted with the remaining aleurone layer or inner coating of the original grain.

7. As a new article of manufacture, a hulled spongy cereal-grain preserving substantially the original shape of the grain and dotted over its surface with the remains of the inner grain coating or aleurone layer.

8. As a new article of manufacture, dry spongy rice, the structure of whose starch-granules has been disrupted substantially throughout its mass, the remains of said starch-granules being contained in the cell-walls of the new article.

9. As a new article of manufacture, a dry spongy swelled grain of rice preserving substantially the shape of the original grain and having its starch-granules disrupted substantially throughout its mass, the remains of the said starch-granules being contained in the cell-walls of the new article.

10. As a new article of manufacture, a hulled spongy grain of rice, the starch-granules of which have been broken up substantially throughout the same, and which is dotted over its surface with the remains of the inner grain coating or aleurone layer.

11. As a new article of manufacture, dry spongy rice, the structure of whose starch-granules has been disrupted substantially throughout its mass, the remains of said starch-granules being contained in the cell-walls of the new article, the said cell-walls capable of being readily dissolved or broken down by water.

In testimony whereof I affix my signature in presence of two witnesses.

ALEXANDER PIERCE ANDERSON.

Witnesses:
D. T. MacDougal,
F. S. Earle.